Nov. 13, 1956 V. E. PALUMBO 2,770,140
CAM MECHANISM
Filed Nov. 27, 1953 3 Sheets-Sheet 2

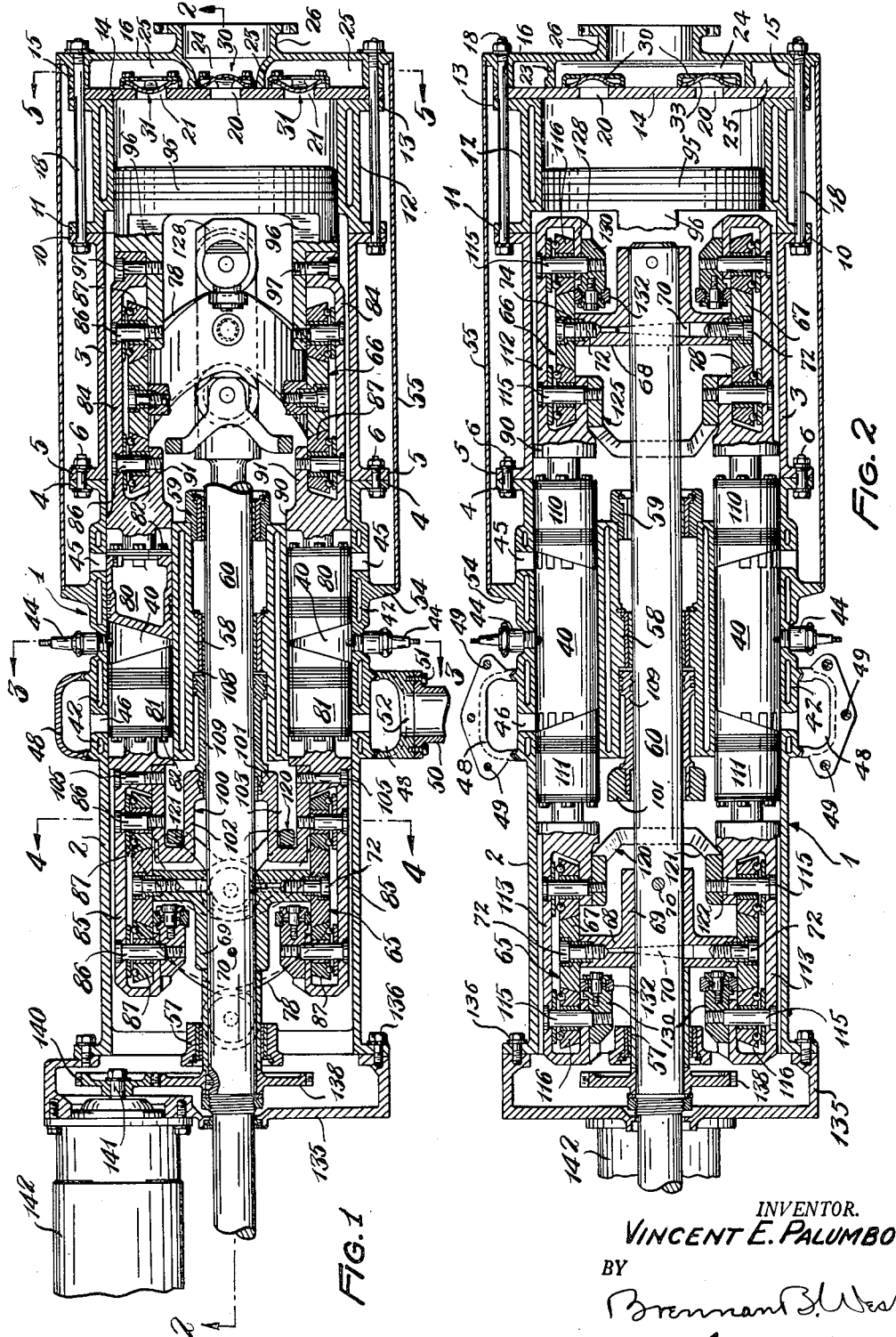

INVENTOR.
VINCENT E. PALUMBO
BY
ATTORNEY

Nov. 13, 1956  V. E. PALUMBO  2,770,140
CAM MECHANISM

Filed Nov. 27, 1953  3 Sheets-Sheet 3

INVENTOR.
VINCENT E. PALUMBO
BY
*Brennan B. West*
ATTORNEY

United States Patent Office 2,770,140
Patented Nov. 13, 1956

2,770,140

CAM MECHANISM

Vincent E. Palumbo, Cleveland Heights, Ohio

Application November 27, 1953, Serial No. 394,649

9 Claims. (Cl. 74—56)

My invention consists, essentially, in improvements in internal combustion engines of the barrel type, or in apparatus of a similar nature, such as pumps or compressors, wherein pistons operate in cylinders that are grouped about a shaft and are disposed with their axes substantially parallel to the axis of the shaft, the pistons having driving connection with the shaft through the medium of cams.

It will become apparent, however, as this description proceeds, that certain of my improvements are of broader application.

I am particularly concerned with engines or other apparatus of the above described character in which spiral cams are employed and the driving connections between the pistons and cams involve rollers that engage the cam faces in a direction axially of the cams and wherein the axis of each roller is substantially normal to and intersects the axis of the cam. It is common in such constructions, in order to minimize or eliminate friction, to taper the rollers and cam faces so that the projected lines of contact between them are coincident with the points of intersection of the axes of the rollers and shaft.

This taper of the rollers and the corresponding inclination of the cam faces, however, create a problem in the type of engine or apparatus above referred to that heretofore has been met with only limited success. Due to the inclination of the contacting surfaces of the rollers and cam faces, there is a strong tendency for the rollers to be displaced outwardly in a radial direction—that is to say, to climb the cam faces—and guide means and bearings, that have been employed in the past to restrain the rollers from outward radial movement, have presented their own difficulties in the way of added friction, structural complications, and lubricating problems.

One object of my invention is to provide means consisting of a rigid tie member and therefore absolutely devoid of friction that will positively restrain the cam engaging rollers wherewith it is used against outward radial movement with respect to the cam faces.

Another object is to provide a two cycle internal combustion engine of the beforementioned type incorporating a relatively large charging cylinder and piston wherein the charging piston serves as means for restraining certain of the cam engaging rollers against outward radial movement.

It is another object of the invention to provide a very simple and efficient check valve that is well adapted for use in connection with the charging cylinder of an engine of the aforesaid character.

Another object of my invention is the provision of a unique form of pump, indicated in the present instance as a part of the lubricating system, that is operated by one of the tie members that restrains the cam engaging rollers associated with it against outward movement.

A further object of the invention is to provide a drum type cam for use in engines or other apparatus of the type described that is comprised of a rim and spider, the latter consisting of a hub surrounded by radially extending supporting means—in the present embodiment, in the form of spokes—whereon the rim is removably mounted. This feature greatly facilitates manufacture and reconditioning of the cam. The fastening means or pins that are utilized for securing the hub of the composite cam to the shaft of the apparatus are in line with screws that secure the rim to the spider and are accessible when said screws are removed.

A still further and more general object of the invention is to provide an apparatus of the character above described that is relatively simple and highly efficient and is so designed and constructed as to expedite and render more convenient the assembly and disassembly of the parts for the purposes of inspection and servicing.

Objects and advantages additional to the ones above enumerated will appear as I proceed to describe my invention by reference to the accompanying drawing wherein like parts are designated by like reference characters in the several views, and in which Fig. 1 is a central longitudinal section through a two cycle internal combustion engine incorporating my improvements, the right hand end of the engine shaft and the major portion of the spider of the corresponding cam being broken away to reveal the underlying piston bar and parts carried thereby;

Fig. 2 is a similar sectional view in a plane at right angles to that of Fig. 1, showing the charging piston in elevation with its near arm broken away;

Figs. 3, 4 and 5 are transverse sections through the engine on the respective lines 3—3, 4—4 and 5—5 of Fig. 1;

Proceeding now with a detailed description of the embodiment of the invention herein disclosed, which is to be understood as illustrative rather than as limiting, 1, generally, denotes the engine housing that is made up of a cylinder block section 2 and an extension or section 3. These sections have mating flanges 4 and 5, respectively, that are secured together by bolts 6. As appears from Figs. 3 and 4, the housing is circular in cross section.

Figure 5:
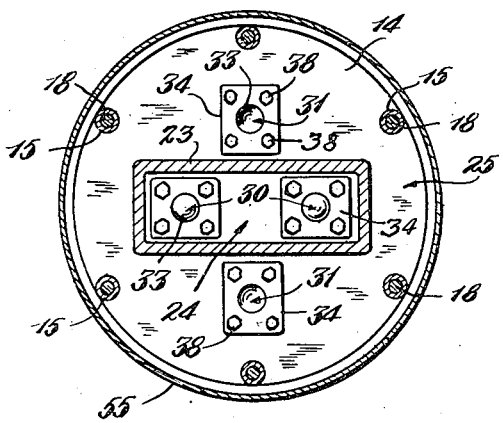

The right hand end of the housing section 3, as the parts are viewed in Figs. 1 and 2, is provided with a flange 10 wherewith the flange 11 of a charging cylinder 12 is engaged. The opposite end of said cylinder is formed with a flange 13 against which bears the edge portion of a flat circular valve plate 14 that is of the same diameter as the flange 13. Engaged with the valve plate, adjacent the edge thereof, are a plurality of bosses 15 of a cap 16, the diameter of the cap being somewhat greater than that of the valve plate. In the present instance, there are six bosses 15, each having a longitudinal bore, the bosses appearing in section in Fig. 5. The flanges 10, 11 and 13 and the valve plate 14, are provided with apertures that are in axial alignment with the bores of the bosses 15, and extending therethrough are tie bolts 18 by which the cap 16, valve plate 14, and cylinder 12 are bound together and secured to the housing section 3.

The valve plate 14 has inlet ports 20 and outlet ports

21. The cap 16 is provided on its inner side with a continuous partition 23 that engages the valve plate 14 and separates the space between the cap and valve plate into an inlet chamber 24 and an outlet chamber 25 that communicate, respectively, through the ports 20 and 21 with the interior of the charging cylinder 12. A central, flanged inlet conection 26 of the cap 16 leads to the chamber 24, and the source of a combustible mixture is adapted to be placed in communication with the connection 26 through a suitable conduit (not shown).

The valve plate 14 mounts two inlet valves, each designated generally by the reference numeral 30, within the inlet chamber 24, and two outlet valves, each designated generally by the numeral 31, within the outlet chamber 25; and these valves are preferably of the type illustrated in Figs. 8 to 11. Each valve is composed of a valve member 33 and a cage 34. The cage includes a flat wall 35, provided with an opening 36, and a peripheral wall 37. The flat wall has holes adjacent its corners for the passage of screws 38 by which the cage is secured to and drawn tightly against the valve plate 14. The valve member 33, made of resilient sheet metal, is dome shaped throughout its central region, and radially extending from said region are divergent legs 39. When the valve member 33 is in relaxed condition, its axial dimension is desirably somewhat greater than the depth of the cage 34. Accordingly, when the parts are assembled and mounted with the valve member confined between the flat wall 35 of the cage and the valve plate 14, the valve member will be somewhat under compression. In order to serve as one of the inlet valves 30, the member 33 is arranged with respect to the cage 34 as illustrated in detail in Fig. 11. Now when suction occurs within the charging cylinder 12 the central portion of the valve member will be drawn inwardly away from the seat surrounding the opening 36 and allow fluid to pass into said chamber through the associated inlet port 20. To serve as an outlet valve 31, the valve member is reversed with respect to the cage and seats against the valve plate about the underlying outlet port 21. When pressure occurs within the charging cylinder, the valve member will be lifted allowing the fluid to flow through the outlet port and on through the opening 36 of the valve cage.

Figure 3:
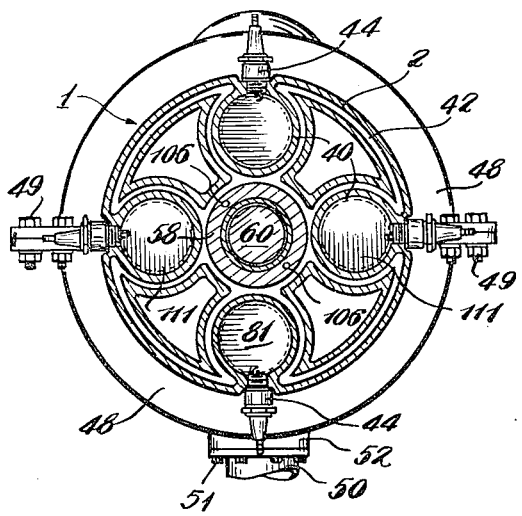
Figure 4:
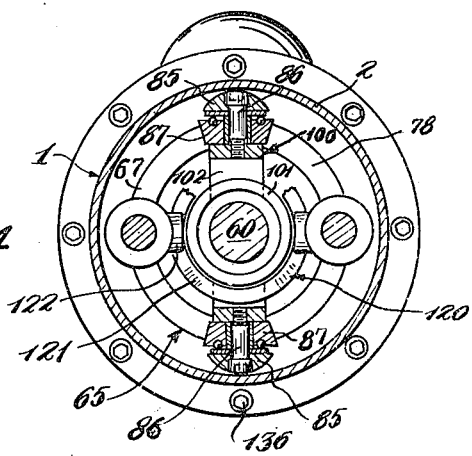

Incorporated in the right hand end of the section 2 of the engine housing are power cylinders 40, there being four such cylinders equally spaced about the housing with their axes parallel to the central axis of the housing. Within the zone of these cylinders the wall of the section 2 is made thicker and cored to provide a water jacket 42 that is continuous throughout the walls that define the power cylinders, as best shown in Fig. 3. The inner threaded ends of conventional spark plugs 44 are threadedly engaged through holes that enter the working cylinders midway of the length of the latter; and extending part way about each cylinder adjacent the ends thereof are inlet and outlet ports 45 and 46, respectively. The latter ports open at their outer ends into an annular exhaust manifold 48, shown as made in halves that are flanged at their ends and secured together by bolts 49. An exhaust pipe 50 is shown as secured by screws 51 to an outlet 52 of the manifold 48.

Surrounding the cylinder block section 2 of the housing, to the left of the inlet ports 45 as the parts are viewed in Figs. 1 and 2, is a flange 54 that corresponds, in diameter, with the previously mentioned cap 16; and a sleeve 55 has its ends engaged with the peripheral portions of said flange and cap. As presently preferred, the flange and cap are rabbeted for the reception of the ends of the sleeve. It will be apparent from this construction that the outlet chamber 25 of the cap 16 is placed in communication, through the interior of said sleeve and the inlet ports 45, with the working cylinders 40.

Desirably formed integral with and centrally of the housing section 2 are bearings 57, 58 and 59 that are provided with suitable bushings, in accordance with common practice, and journaled in said bearings is the engine shaft 60.

Figure 12:
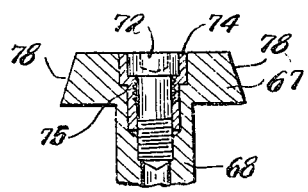
Fig. 12 is an enlarged sectional detail of one of the cams.

Mounted upon and secured to the engine shaft within the ends of the housing 1 are cams that are designated generally by the reference numerals 65 and 66. These cams are identical, and each is shown as composed of a rim 67 and a spider 68, the latter including a hub 69 that surrounds the shaft and is secured thereto by tapered pins 70 that extend through holes of appropriate size and shape in the shaft 60. The pins 70 are desirably aligned with bores in the parts or spokes of the spider 68 to which the rim 67 is secured by screws 72. These screws thus serve to close the ends of the bores that accommodate said pins, the bore at one end corresponding in diameter with the maximum diameter of the pin so that the pin may be inserted through said end, while the opposite and smaller end of the bore is accessible when the appropriate screw 72 is removed for the insertion of an implement by which the tapered pins 70 may be dislodged from the hole in the shaft. As best shown in the detail view of Fig. 12, a bushing 74 surrounds the head and adjacent portion of the body of each screw 72 and occupies a hole in the rim 67 of proper size and shape and projects into a counterbore of the spider 68. The bushing, therefore, serves as a dowel for locking the rim to the spider against relative movement. Each bushing 74 is internally threaded at 75 to receive the threaded part of a tool (not shown) for extracting the bushing. It will be seen, therefore, that each cam 65 and 66 is of the drum type, and the end surfaces of the drum constitute cam faces 78.

Operating in opposed relation to each other within each power cylinder 40 are two pistons that have operative connection, respectively, with the cams 65 and 66, in a manner presently to be described. By reason of the shape of the undulated faces of the cams, the pistons in one pair of diametrically opposed cylinders act in reverse order to the pistons in the other pair. That is to say, when the pistons in one pair of cylinders are moving outwardly as the result of an explosion, the pistons in the other pair of cylinders are moving inwardly to compress a fresh charge of combustible mixture.

In each of the cylinders 40 appearing in Fig. 1 are pistons 80 and 81. The inner ends or heads of these pistons are slanted as shown to better direct the incoming mixture for scavenging purposes, as will be readily understood by those skilled in the art, and to the outer or opposite ends of the pistons are secured, by screws 82, the respective piston rods or bars 84 and 85. Two stub shafts 86, so termed because of their function, are carried by each of the piston bars, and these stub shafts rotatably mount cam engaging rollers 87. Said shafts have heads at their outer ends and are threaded at their inner ends, and the rollers are fitted with bushings and thrust bearings in accordance with conventional practice.

The rollers 87 are frusto conical for cooperation with the complementary tapered faces 78 of the cams, and the apexes of the projected conical surfaces of the rollers coincide with the points of intersection between the axes of the stub shafts 86 and the engine shaft 60, this being for the obvious purpose of preventing friction at any point within the line of contact between a roller and the cam face, such as would occur if the rollers were cylindrical, for example, and the cam faces were correspondingly shaped. It is this circumstance, however, as hereinbefore pointed out, that creates the tendency of the rollers to be displaced radially outwardly.

The piston bars 84 differ from those designated 85, although each has a cylindrical part 90 that enters the adjacent end of the cylinder 40 when the pistons are fully retracted. Each of the opposed piston bars 84 includes a lug 91 into a threaded aperture of which is screwed the inner end of the adjacent stub shaft 86. Operating within the previously mentioned relatively large cylinder 12 that is located at the right hand end of the engine housing, as the parts are viewed in Figs. 1 and 2, is a charging piston 95, from the outer end of which extend diametrically opposed arms 96 that for a part of their length underlie the adjacent ends of the piston bars 84 and are secured thereto by screws 97. The threaded inner ends of the adjacent stub shafts 86 are also screwed into threaded apertures in the ends of the arms 96 remote from the piston 95.

By reason of this construction, the charging piston 95 is operated by the power pistons 80. Also, the piston bars 84 and the associated rollers 87 are positively held against outward movement with respect to the cam 66.

Figure 6:
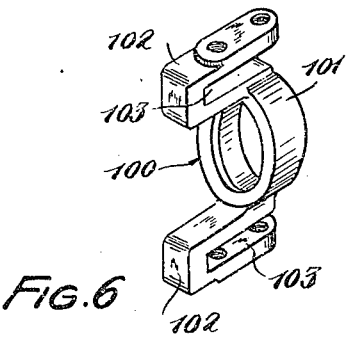
Fig. 6 is a perspective view of one of the tie members for holding opposed piston bars and the cam engaging rollers carried thereby against outward movement.

The opposed bars 85 of the pistons 81 are similarly held against outward movement by a tie member 100, shown in perspective in Fig. 6. This member consists of a collar 101 that encircles the shaft 60, and a pair of diametrically opposed gooseneck arms 102 that define slots 103. The outer branches of the arms 102 are engaged with the inner sides of the piston bars 85 and are secured thereto by screws 105, and by the adjacent stub shafts 86, the threaded inner ends of which are screwed into tapped holes in said arms.

While the primary purpose of the tie member 100 is to restrain the opposed piston bars 85 and the rollers 87 that are carried thereby against outward radial movement, it serves a secondary purpose of operating a unique construction of pump which may be utilized for circulating oil through the lubricating system of the engine. Systems of this sort are old in the art and are designed to meet the requirements of the particular apparatus wherewith they are used, and since the lubricating system forms no part of the present invention, illustration of it is omitted from the drawings. In the cross sectional view of Fig. 3, however, ports 106 are shown which, it may be explained, lead to a pump cylinder 108 that occupies a central position within the housing section 2; and said ports may be equipped with reversely acting check valves, in accordance with common practice, to render one an inlet port and the other an outlet port. Operating within the pump cylinder 108 is an annular piston 109 that surrounds the engine shaft 60 and has one of its ends secured to the collar 101 of the tie member 100. From the construction described, it is evident that, as the power pistons 81 reciprocate, like movement will be imparted to the pump piston 109.

I have so far described the pistons that operate in the power cylinders revealed in the sectional view of Fig. 1. Operating within the opposed cylinders 40 that are located midway between the former power cylinders, are pistons 110 and 111 (Fig. 2). The bars of the respective pistons 110 and 111 are designated 112 and 113, each carrying stub shafts 115 whereon the cam engaging rollers 116 are rotatably mounted.

Figure 7:
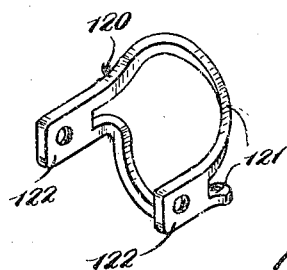
Fig. 7 is a similar view of another type of tie member used in the engine.
Figure 8:
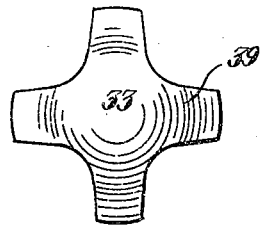
Figs. 8 and 9 are elevational views, at right angles to each other, of the valve member of my improved check valve.
Figure 10:
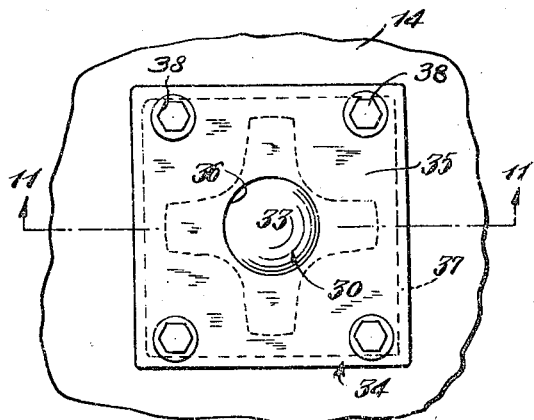
Fig. 10 is a fragmentary elevational view of the valve plate with one of the check valves mounted thereon.
Figure 9:
Figure 11:
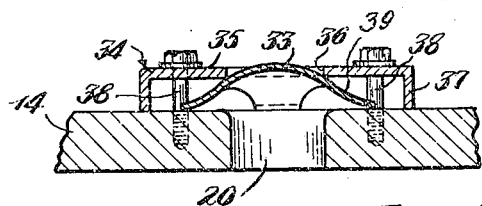
Fig. 11 is a section on the line 11—11 of Fig. 10.

The undulated roller engaging faces of the cams 65 and 66 are identical, and each cam face is divided circumferentially into four equal reaches, the successive ones of which are reversed with respect to each other. Also, as arranged upon the shaft 60, each cam is the reverse of the other. As a consequence, the action of the pistons 110 and 111 is the opposite of that of the pistons 80 and 81. In other words, as the pistons 80 and 81 move outwardly, the pistons 110 and 111 approach each other, and vice versa. The piston bars 113 of the pair of power pistons 111 are positively held against outward radial movement by a tie member 120, shown in perspective in Fig. 7. This member is in the form of a yoke including arms 121 that encircle or bridge the shaft 60 and merge at their ends into lugs 122. These lugs are engaged with the inner sides of the piston bars 113 and are held thereto by the adjacent stub shafts 115 that have their threaded inner ends screwed into threaded holes in said lugs. The arms 121 of the tie member 120 are accommodated by the slots 103 in the gooseneck arms of the tie member 100, as said tie members move in opposite directions. A tie member 125, similar to the one designated 120 that has just been described, is secured to the bars 112 of the pistons 110, for holding them against outward movement.

Additional means which I shall now describe are included in the present embodiment for restraining the respective pairs of opposed piston bars 85, 112 and 113 against outward radial movement. The outer ends of these bars are extended radially inwardly and thence in an axial direction beneath the adjacent cam engaging rollers. The parts extending beneath said rollers are designated 128 and are provided with channels within which are fitted blocks 130. These blocks are secured to the parts 128 by having the threaded inner ends of the adjacent stub shafts screwed into threaded holes of said blocks; and at their inner ends said blocks carry rollers 132 that engage tracks constituted of the inner sides of the rims 67 of the cams 65 and 66.

Applied to the left hand end of the engine housing, as it is viewed in Figs. 1 and 2, is a gear case 135. This case is fastened to the adjacent flanged end of the housing by screws 136. A gear 138 is secured to the engine shaft inside the casing 135 and may be used for driving various associated mechanisms common in internal combustion engines. In the present disclosure the gear 138 meshes with a pinion 140 on the shaft 141 of a motor-generator 142. When operating as a motor it serves as a starter for the engine, and when being driven by the engine it serves as a generator to supply current for the ignition system, as well as for other purposes if desired.

Considering the engine in operation: as the pistons 80 and 81 in each of the cylinders 40 move inwardly they compress a charge of explosive mixture in the central region of the cylinder. This movement of the pair of opposed pistons designated 80 is transmitted through the bars 84 and arms 96 to the charging piston 95, causing a quantity of explosive mixture to be drawn into the charging cylinder through the ports 20. The beforementioned charge that has been compressed within the opposed cylinders containing the pistons 80 and 81 is now fired by energization of the appropriate spark plugs 44 and the pistons are driven apart. This linear motion of the pistons is converted into rotary motion of the shaft 60 through the cams 65 and 66 and, at the same time, the charging piston 95 is advanced to force the explosive mixture from the charging cylinder through the ports 21 and chamber 25 into the enclosure of the sleeve 55. When the power pistons 80 and 81 have moved far enough to uncover the inlet and exhaust ports 45 and 46, respectively, a charge of mixture enters the cylinders and purges them of burnt gases. These gases are driven out through the ports 46 and are conducted to the exhaust pipe 50 through the manifold 48. While this action is going on in the cylinders containing pistons 80 and 81, a reverse action is occurring in the cylinders wherein the pistons 110 and 111 operate, thereby to compress a charge in each of the last mentioned cylinders to await explosion by energization of the corresponding spark plugs.

While the mixture is being drawn into and expelled from the charging cylinder 12 by the action of the piston 95, the valve members 33 of the respective inlet and outlet valves 30 and 31 will alternately withdraw from and re-engage their seats in an obvious manner, the legs 39 yielding to permit of such action.

Attention is directed to the reverse inclination of the inner ends of the opposed pistons 80 and 81 and 110 and 111. As will be observed in Figs. 1 and 2, said ends converge in a direction away from the cylinder walls through which the inlet ports 45 and the exhaust ports 46 open. While this arrangement, obviously, enhances the scavenging of the cylinders, it has a further advantage of providing a combustion space of a shape that will insure instantaneous and uniform spread of ignition and effective distribution of power resulting from the combustion of the mixture. Also, due to the inclination of the inner ends of the pistons as above described, the forces resulting from compression and explosion will be in a direction to better balance the outward forces imposed upon the piston structures by the tapered rollers as they traverse the outwardly converging faces of the cams.

Having thus described my invention, what I claim is:

1. In apparatus of the type described, a generally cylindrical housing, a shaft journaled therein with its axis substantially coincident with that of the housing, the housing including cylinders that are spaced apart circumferentially of the housing with their axes substantially parallel to the axis of the shaft, pistons reciprocable in said cylinders, piston bars rigid with and extending axially from the pistons, frusto conical cam engaging rollers rotatably supported by and spaced apart along each piston bar, a drum cam on the shaft having circumferential undulated cam faces engaged by the spaced rollers of the respective piston bars, the axis of each roller intersecting the axis of the shaft at substantially right angles, and the apex of the projected conical surface of each roller being substantially coincident with the point of intersection of the axis of said roller and shaft, each cam face having a taper complementary to that of the rollers that engage said face, rigid tie means bridging the shaft and reciprocable therealong between the cam and cylinders and secured to opposed piston bars for restraining them against outward radial movement, a device on each of the opposed piston bars located beyond the side of the cam remote from said tie means and disposed within the radius of the drum cam and engaging a circumferential part of the cam for holding the adjacent portion of the piston bar against outward movement, the undulations of the cam faces being at all times identically related to the two piston bars connected by each of the aforesaid tie means whereby the corresponding pistons are caused to move simultaneously in the same direction and at the same speed.

2. In cam mechanism, a rotary cam having an undulated circumferential cam face inclined to the axis of the cam, tapered rollers corresponding to the inclination of the cam face spaced apart about the cam in contact with said cam face, the axes of said rollers intersecting the axis of the cam, and the projected line of contact between each roller and said cam face being substantially coincident with the point of intersection of the axes of the roller and cam, a plurality of means each reciprocable along a path parallel to the axis of the cam and rotatably mounting one of said rollers, the undulations of the cam face being at all times identically related to the different rollers whereby said roller mounting means are caused to move in unison, and rigid tie means between the mounting means of the different rollers for holding them against radial displacement.

3. In cam mechanism, a rotary cam having an undulated circumferential cam face inclined to the axis of the cam, a frusto conical roller whose taper corresponds to the inclination of the cam face engaging said face and arranged with its axis intersecting at substantially right angles the axis of the cam, the projected conical surface of the roller having its axis substantially coincident with the point of intersection of said axes, means reciprocable along a path parallel to the axis of the cam and rotatably mounting said roller, and holding means within the radius of the cam and having connection with the roller mounting means for restraining the latter against radially outward movement.

4. In cam mechanism, a rotary cam having an undulated circumferential cam face inclined to the axis of the cam, a frusto conical roller the taper of which corresponds to the inclination of the cam face and engaging said face, the axis of the roller intersecting at substantially right angles the axis of the cam, the projected conical surface of the roller having its apex substantially coincident with the point of intersection of said axes, means reciprocable along a path parallel to the axis of the cam and rotatably mounting said roller, the cam being provided with an internal track of constant radius, a part on said mounting means disposed inwardly of the cam face, and a roller on said part engaging said track.

5. In cam mechanism, a rotary cam having an undulated circumferential cam face inclined to the axis of the cam, a frusto conical roller the taper of which corresponds to the inclination of the cam face and engaging said face, the axis of the roller intersecting at substantially right angles the axis of the cam, the projected conical surface of the roller having its apex substantially coincident with the point of intersection of said axes, means reciprocable along a path parallel to the axis of the cam and rotatably mounting said roller, the cam being provided with an internal track of constant radius, an extension on said mounting means that projects radially inwardly and thence beneath said track in spaced relation thereto, and a roller on said extension engaging said track.

6. In apparatus of the type described, a housing, a shaft journaled therein, the housing incorporating cylinders that are spaced apart about the shaft with their axes substantially parallel to the axis of the shaft, structures including pistons which latter are reciprocable in the cylinders, a cam on the shaft having an undulated cam face at an angle to the axis of the shaft, followers carried by said structures and engaging the cam face in a direction axially of the cam, the undulations of the cam face being at all times identically related to the followers of certain of said structures which comprise a set, and rigid tie means bridging the shaft and fixedly secured to the structures of a set for holding said structures against relative movement.

7. In cam mechanism, a rotary cam having a circumferential cam face at an angle to the axis of the cam, a cam follower engaging said face, the cam face, by reason of its angularity, tending to thrust the follower radially outwardly means reciprocable along a path parallel to the axis of the cam and mounting said follower, the cam being provided with an internal track of constant radius facing toward the axis of the cam, a part on said mounting means disposed inwardly of the track, and a follower on said part bearing outwardly in a radial direction against said track.

8. Means for incorporation in apparatus of the kind involving a shaft mounting a cam having a tapered undulated cam face and cylinders radially spaced from and substantially parallel to the shaft, and structures including pistons reciprocable in the cylinders and carrying tapered rollers engaging the cam face; said means consisting of two rigid tie members, each bridging the shaft and fixedly secured to diametrically opposed structures for restraining said structures against outward radial movement, said tie members being reciprocable with said structures longitudinally of the shaft in overlapping relation to each other and shaped to escape each other so as to prevent mutual interference.

9. Means for incorporation in apparatus of the kind involving a shaft mounting a cam having a tapered undulated cam face and two pairs of cylinders radially spaced from and substantially parallel to the shaft, the cylinders of each pair being diametrically opposed, and structures including pistons reciprocable in the cylinders and carrying tapered rollers engaging the cam face; said means consisting of a rigid tie member comprising a collar that encircles the shaft, and diametrically opposed gooseneck arms carried by the collar and to which are secured the opposed structures of one pair for holding the structures against outward radial movement, said arms defining slots that are substantially parallel to the shaft, and a second rigid tie member comprising arms that encircle the shaft and are secured at their ends to the other pair of opposed structures, the slots defined by the gooseneck arms accommodating the arms of the second tie member as the structures move in opposite directions.

(References on following page)

References Cited in the file of this patent

UNITED STATES PATENTS

| | | |
|---|---|---|
| 1,183,470 | Lee | May 16, 1916 |
| 1,352,985 | Murphy | Sept. 14, 1920 |
| 1,445,686 | Hult | Feb. 20, 1923 |
| 1,757,778 | Mehlum | May 6, 1930 |
| 1,772,531 | Williams | Aug. 12, 1930 |
| 1,808,083 | Tibbetts | June 2, 1931 |
| 1,913,730 | Sherman | June 13, 1933 |
| 1,930,297 | Welch | Oct. 10, 1933 |
| 2,118,804 | Andersen | May 31, 1938 |
| 2,133,842 | Bailey | Oct. 18, 1938 |
| 2,220,609 | McCarthy | Nov. 5, 1940 |
| 2,353,313 | Lane | July 11, 1944 |
| 2,445,902 | Bell | July 27, 1948 |
| 2,514,728 | Slaterus | July 11, 1950 |
| 2,567,576 | Palumbo | Sept. 11, 1951 |
| 2,598,122 | Hansen | May 27, 1952 |

FOREIGN PATENTS

| | | |
|---|---|---|
| 264,893 | Great Britain | June 26, 1927 |
| 431,237 | Great Britain | July 3, 1935 |
| 796,660 | France | April 11, 1936 |